US012792510B2

(12) United States Patent
Stockmann et al.

(10) Patent No.: US 12,792,510 B2
(45) Date of Patent: Nov. 10, 2026

(54) FRAMEWORK FOR DRAM TO PHYSICAL ADDRESS CONVERSION

(71) Applicant: Microsoft Technology Licensing, LLC, Redmond, WA (US)

(72) Inventors: John Henry Stockmann, Portland, OR (US); Michael Edward Borgens, Hillsboro, OR (US); Kok Lim Patrick Lee, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/911,079

(22) Filed: Oct. 9, 2024

(65) Prior Publication Data

US 2026/0099442 A1 Apr. 9, 2026

(51) Int. Cl.
*G06F 12/02* (2006.01)
*G06F 12/0811* (2016.01)
*G06F 12/0846* (2016.01)

(52) U.S. Cl.
CPC ...... *G06F 12/0292* (2013.01); *G06F 12/0811* (2013.01); *G06F 12/0851* (2013.01)

(58) Field of Classification Search
CPC ............. G06F 12/0292; G06F 12/0811; G06F 12/0851; G06F 2212/1008; G06F 12/0813; G06F 12/0846; G06F 2212/1016; G06F 2212/1032; G06F 2212/1052; G06F 2212/221; G06F 2212/2532; G06F 2212/254; G06F 12/0284; G06F 12/0607
USPC .............................................................. 711/3
See application file for complete search history.

(56) References Cited

U.S. PATENT DOCUMENTS

| | | | | |
|---|---|---|---|---|
| 11,972,140 | B2 | 4/2024 | Fishwick | |
| 12,321,260 | B1 * | 6/2025 | Krimer | G06F 3/064 |
| 2016/0292073 | A1 * | 10/2016 | Wang | H03M 13/276 |
| 2024/0037046 | A1 * | 2/2024 | Mombers | G06F 13/28 |
| 2024/0257890 | A1 * | 8/2024 | Wei | G11C 29/023 |

FOREIGN PATENT DOCUMENTS

WO 2024196846 A1 9/2024

OTHER PUBLICATIONS

International Search Report and Written Opinion received for PCT Application No. PCT/US2025/037468, mailed on Oct. 7, 2025, 20 Pages.

* cited by examiner

*Primary Examiner* — Hua J Song
(74) *Attorney, Agent, or Firm* — Seed Intellectual Property Law Group LLP

(57) ABSTRACT

The described technology provides a method including determining, based on a system physical address, a cluster of L3 cache nodes that are linked to a group of memory controller nodes, determining, based on the system physical address, an L3 cache node tied to a component hub in a SoC mesh, determining a memory controller node in the SoC mesh that maps to the system physical address, generating a deinterleaved address by relocating low DRAM space of the system physical address and removing the cache cluster bits from the system physical address, mapping the deinterleaved physical address to a DRAM address by assigning bits to DRAM address components, and storing the bit assignments of the DRAM address components.

20 Claims, 6 Drawing Sheets

FRAMEWORK FOR DRAM TO PHYSICAL ADDRESS CONVERSION

BACKGROUND

The hierarchical memory structure is designed to optimize the performance and efficiency of computer systems by organizing different types of memory based on speed, cost, and capacity. The CPU interacts with both DRAM (Dynamic Random-Access Memory) and SRAM (Static Random-Access Memory) to efficiently store and retrieve data. When the CPU needs data, it first checks the SRAM, which serves as a cache due to its faster access times. If the data is not found in the SRAM, the CPU sends a physical address to the memory controller to fetch the data from the DRAM. The memory controller accesses the specified address in the DRAM, retrieves the data, and sends it back to the CPU. Frequently accessed data may then be stored in the SRAM for quicker future access. This hierarchical approach, utilizing addressing to locate data, ensures that the CPU can quickly access and store data, optimizing overall system performance. DRAM requires periodic refresh cycles to maintain data integrity, while SRAM does not need refreshing due to its stable storage cells. This forward mapping from a physical address to DRAM address is done in hardware and continuously optimized for performance, reliability, and power savings.

SUMMARY

The described technology provides a system and method for providing DRAM to physical address conversion. The process begins by determining a cluster of cache nodes using a hashing of the system physical address bits. This cluster, which is identified in the first level of hierarchical hashing, consists of a group of L3 cache nodes that map to a specific set of memory controller nodes. After the cluster is determined, an additional hashing algorithm is performed on the system physical address bits to identify the corresponding L3 cache node linked to a component hub in the SoC mesh. Next, the system determines a memory controller node in the SoC mesh that maps to the system physical address by modulo operation of address bits. A deinterleaved address is generated by relocating the low DRAM space of the system physical address and removing the cache cluster bits. Finally, the system maps the deinterleaved physical address to a DRAM address by assigning bits to the DRAM address components and storing these bit assignments.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Dynamic RAM (DRAM) has a specific structure which makes access to different parts incur different overhead. The structure of a typical DRAM may include rows, columns, banks, bank groups, etc. DRAM address mapping is the way the system physical address is mapped to the physical DRAM address bits which are partitioned into rows, columns, banks, and bank groups, etc. This forward mapping from a system physical address to DRAM address is typically done in hardware. Therefore, it is difficult to provide reverse mapping from DRAM address to physical address.

The technology disclosed herein provides forward mapping from a system physical address to DRAM address using software such that it is capable of providing reverse address translation from DRAM address to system physical address. Specifically, the disclosed system provides an address mapping system that can understand and convert different types of system physical addresses that map to DRAM memory, and both forwards and reverse translations. The address mapping system is implemented using software and is useful in supporting the reliability and efficiency of cloud platforms, which are large networks of remote servers. Determining the source of an issue such as a DRAM memory error allows for cloud platform providers to provide good support to customers and fix problems.

The implementations of the system for providing a framework for system physical address to DRAM and vice-versa provides a method including determining, based on a system physical address, the cluster of L3 cache nodes or cache cluster, an L3 cache node tied to a component hub in the SoC mesh, determining a memory controller node in the SoC mesh that maps to the system physical address, generating a deinterleaved address by relocating low DRAM space of the system physical address and removing the cache cluster bits from the system physical address, mapping the deinterleaved physical address to a DRAM address by assigning bits to DRAM address components, and storing the bit assignments of the DRAM address components.

Figure 1:
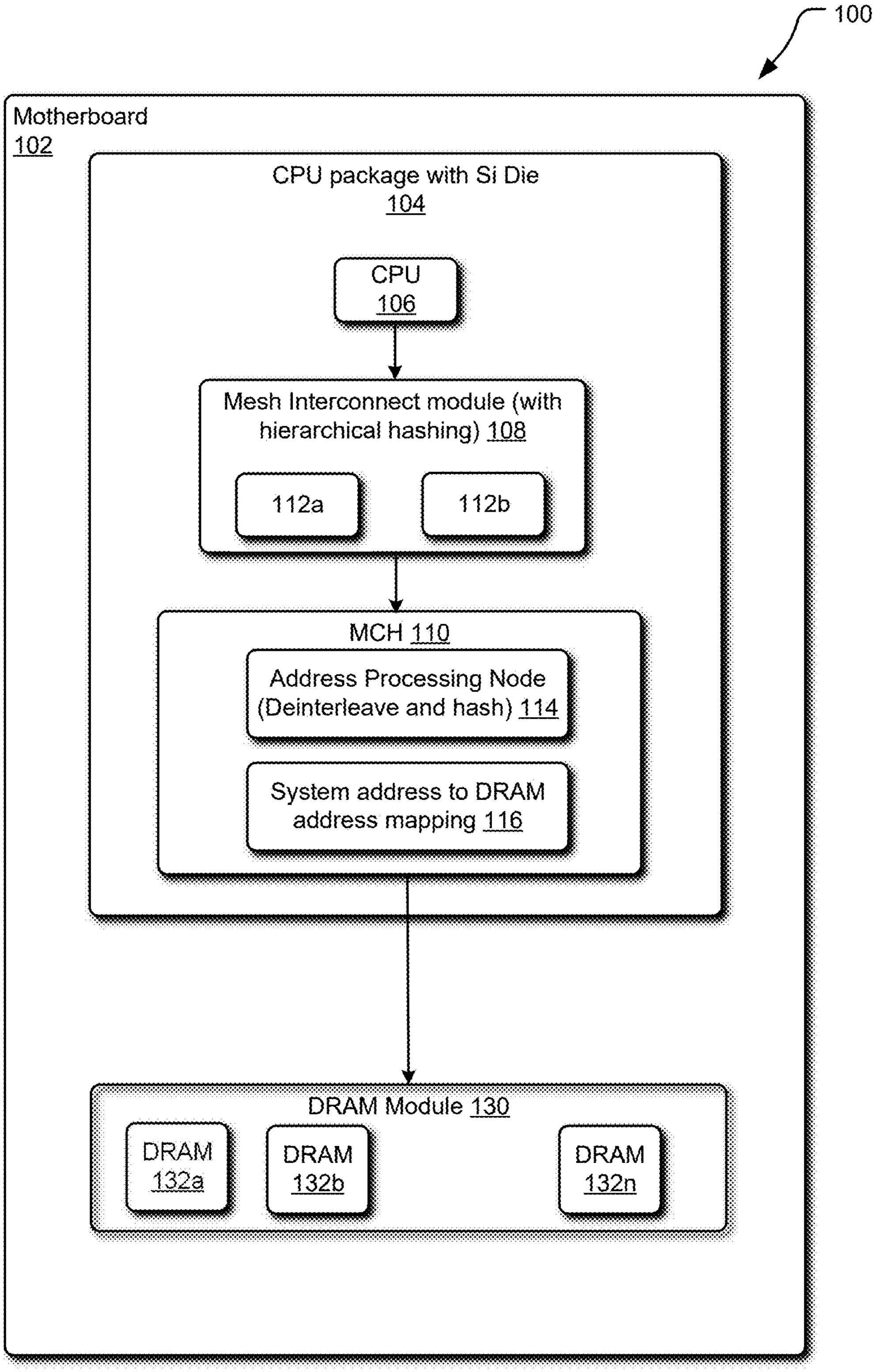
FIG. 1 illustrates an example implementation of a system for providing forward and reverse mapping between physical address and DRAM address.

FIG. 1 illustrates an implementation of a system 100 for providing forward and reverse mapping between physical address and DRAM address. The system 100 may be a computing system implemented on a motherboard 102. The illustrated implementation of the system 100 may include a CPU package 104 with a silicon die and a DRAM module 130. Specifically, the CPU package 104 may include a processor, such as a CPU 106 using a mesh interconnect module 108, and a memory controller hub (MCH) 110 to access the DRAM module 130. In one implementation, the CPU 106 may communicate a system physical address to the mesh interconnect module 108, wherein the system physical address may be, for example, 48 bits, etc. The system physical address may be the actual address in the main memory where data is stored. For example, the system physical address may be a location in physical memory as determined by the CPU 106.

The mesh interconnect module 108 may perform hierarchical hashing 112*a* on the system physical address received from the CPU 106 to generate the data cache cluster, level L3 cache node, and memory controller (MC) node information. Implementations of the mesh interconnect module 108 performing hierarchical hashing are further illustrated below in FIGS. 2, 3, 5, etc. The mesh interconnect module 108 may be implemented on an interconnect on the CPU package 104. Furthermore, the mesh interconnect module 108 may also perform L3 cache node to MC node mapping 112*b*.

An implementation of the MCH 110 also includes an address processing node 114 and a mapping module 116. The address processing node 114 and a mapping module 116 may be implemented as part of the MCH 110. The address processing node 114 may perform deinterleave and hash functions. Specifically, the address processing node 114 receives the system physical address and perform a series of functions on the system physical address to relocate the low address DRAM and remove cache cluster bits from the system physical address. For example, for input system physical address of 0×8080000000, the address processing node 114 may generate a processed deinterleaved address of 0×000000080800, which indicates relocation of low address DRAM and removal of the cache cluster bits. In one implementation, the relocation of low address DRAM is based on an address map node. Specifically, if the system has a lower memory space and is segregated from a higher memory space, then relocating the lower DRAM address space to create a contiguous address may be a requirement. This may be typically performed in the address processing node 114 along with the deinterleave and hashing functions.

The mapping module 116 takes the processed deinterleaved address as an input and generates mapped DRAM address as an output. For example, the mapping module 116 maps the deinterleaved physical address to a DRAM address by assigning bits to DRAM address components. In one implementation, the mapping of the processed deinterleaved address to the DRAM address is a direct mapping of bits in the processed deinterleaved address to locations in DRAM. Thus, for example, given the system physical address of 0x8080000000 and the processed deinterleaved address of 0x000000080800, the output DRAM address may be:

Rank: 0x0
Bank Group: 0x0
Bank: 0x2
Row: 0x200
Column: 0x0

The DRAM module 130 may also include various DRAMs (represented by DRAMs 132*a*, 132*b*, . . . 132*n*) implemented on the motherboard 102.

Figure 2:
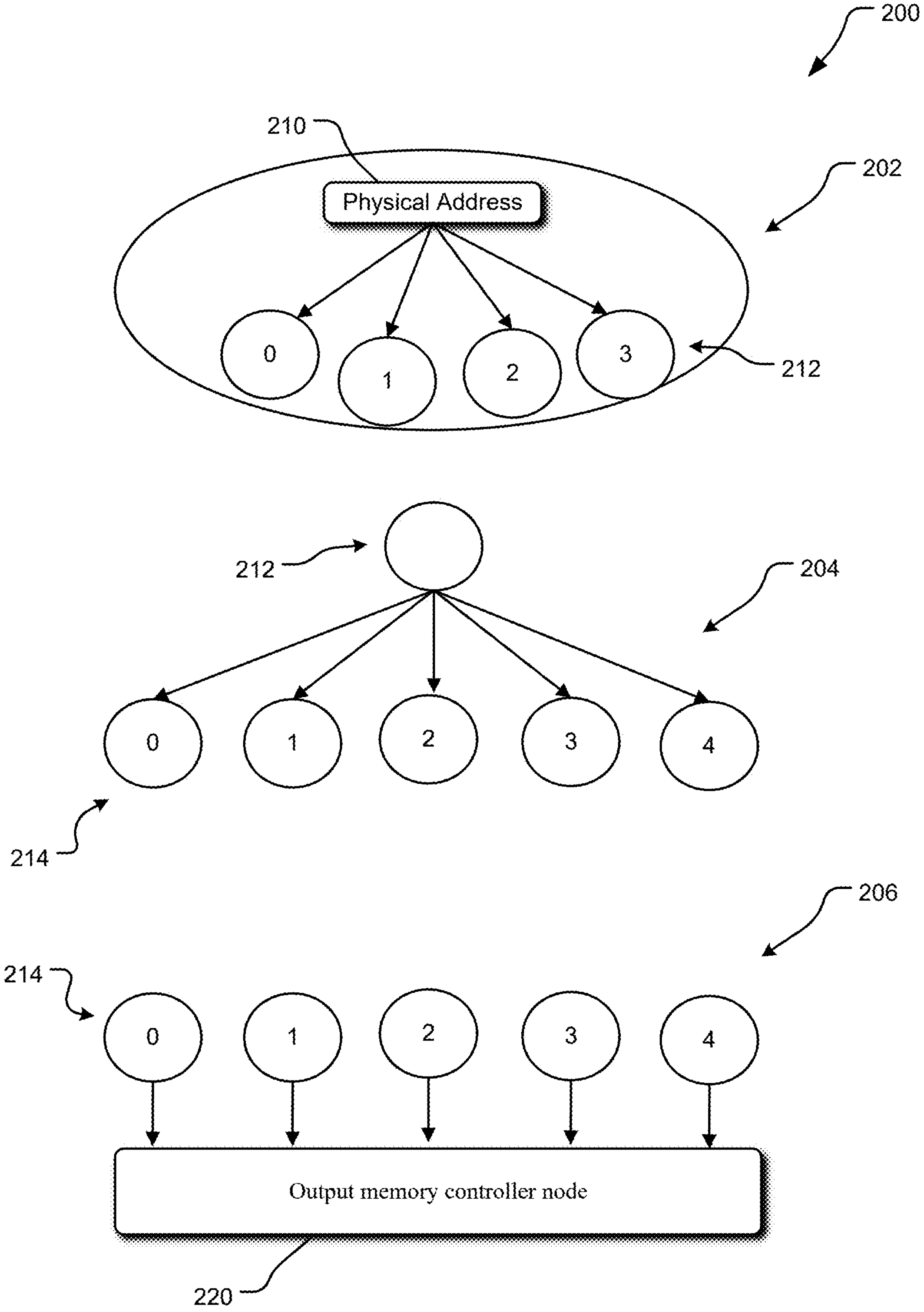
FIG. 2 illustrates example translation stages for providing forward mapping between physical address and DRAM address.

FIG. 2 illustrates translation stages 200 for providing forward mapping between system physical address 210 and memory controller node 220. Specifically, each of the translation stages 202, 204, 206 may be different from each other. Specifically, the first stage 202 may provide power of two hashing, the second stage 204 may provide a non-power of two hashing, and the third stage 306 may provide modulo striping across memory controller nodes.

Specifically, at stage 202 a power of two hashing is performed on the system physical address 210. Specifically, stage 202 takes the system physical address 210 and determines a particular cache cluster 212 on the SoC mesh (such as the SoC mesh 500 illustrated in FIG. 5). Here the selected cache cluster may represent a grouping of L3 system level caches (SLCs) or nodes. In one implementation, the power of two hashing may be hierarchical hashing. For example, for a 48-bit system physical address, such hierarchical hashing may involve, hashing (for example, using an XOR operation) a first set of bits to generate the first bit of the cache cluster, 212, hashing a second set of bits to generate the second bit of the cache cluster 212, and hashing a third set of bits, to generate the third bit of the cache cluster 212. Here the three bits generated by the hierarchical hashing defines one of the eight cache clusters on the SoC mesh 500. For example, for a system physical address 210 of 0x8080000000, the stage 202 generates the cache cluster 212 to be 0x3.

At stage 204, a non-power of two hash is performed to define a component hub node and an L3 cache node 214 tied to a component hub in an SoC mesh. In one implementation, the non-power of two hash may involve hashing of a predetermined number of bits of the system physical address 210, creating a hash multiplier, and performing a shift of another of the system physical address 210 to get a non-power of two modulo. Here, one of the bits of the non-power of two modulo maps the L3 cache node 214 (either 0 or 1).

Stage 206 may perform memory striping to get the memory controller node in the SoC mesh that maps to the given cache cluster as determined at stage 202. In one implementation, the striping may include taking a predetermined number of bits of the system physical address 210, shifting of another of the system physical address 210, performing a logical OR of another top address bit, and performing a modulo 3 operation to get output memory controller node 220 as 0, 1, or 2—for the given cache cluster.

Figure 3:
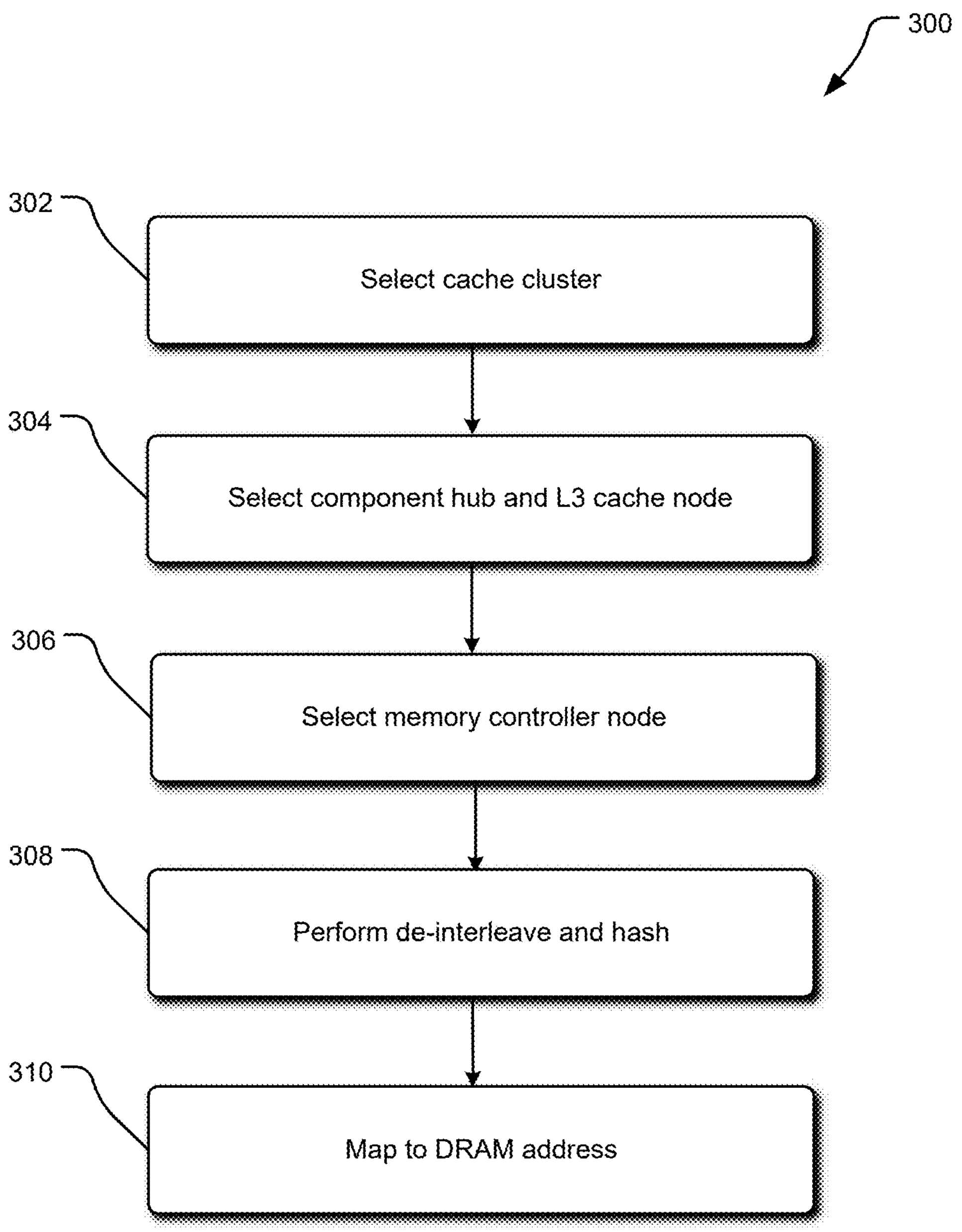
FIG. 3 illustrates an example flowchart of operations for providing forward mapping between physical address and DRAM address.

FIG. 3 illustrates operations 300 for providing forward mapping between physical address and DRAM address. An operation 302 selects cache cluster and appends the cache cluster bits to the system physical address. In one implementation, selecting the cache cluster bits may be done by performing a power of two hashing on the system physical address. Specifically, the operation 302 takes the system physical address and determines a particular cache cluster on the SoC mesh (such as the SoC mesh 500 illustrated in FIG. 5). Here the selected cache cluster may represent a grouping of L3 system level caches (SLCs) or nodes. In one implementation, the power of two hashing may be hierarchical hashing.

An operation 304 selects L3 cache node. In one implementation, selecting the L3 cache node may be done by performing a non-power of two hashing on the system physical address. In one implementation, the non-power of two hash may involve hashing of bits 0-11 of the system physical address, creating a hash multiplier, and performing a shift of 12 to get a non-power of two modulo. Here one of the bits of the non-power of two modulo maps the L3 cache node 214 (either 0 or 1).

An operation 306 selects a memory controller node. In one implementation, the selecting of the memory controller node may involve performing a striping operation and a modulo operation. The memory controller node is the node that maps the system physical address to the memory controller node on the SoC mesh. The striping may include taking a predetermined number of bits of the of the system physical address 210, shifting another of the system physical address 210, performing a logical OR of another top address bit, and performing a modulo 3 operation to get output memory controller node 220 as 0, 1, or 2—for the given cache cluster.

An operation 308 performs a deinterleave and hash operation to relocate low DRAM space, remove the cache cluster bits, and to hash the bank bits of the DRAM address. Finally, an operation 310 generates a mapping to the DRAM address by assigning the bits to the rank, bank group, bank, row, and column locations of the DRAM address.

Figure 4:
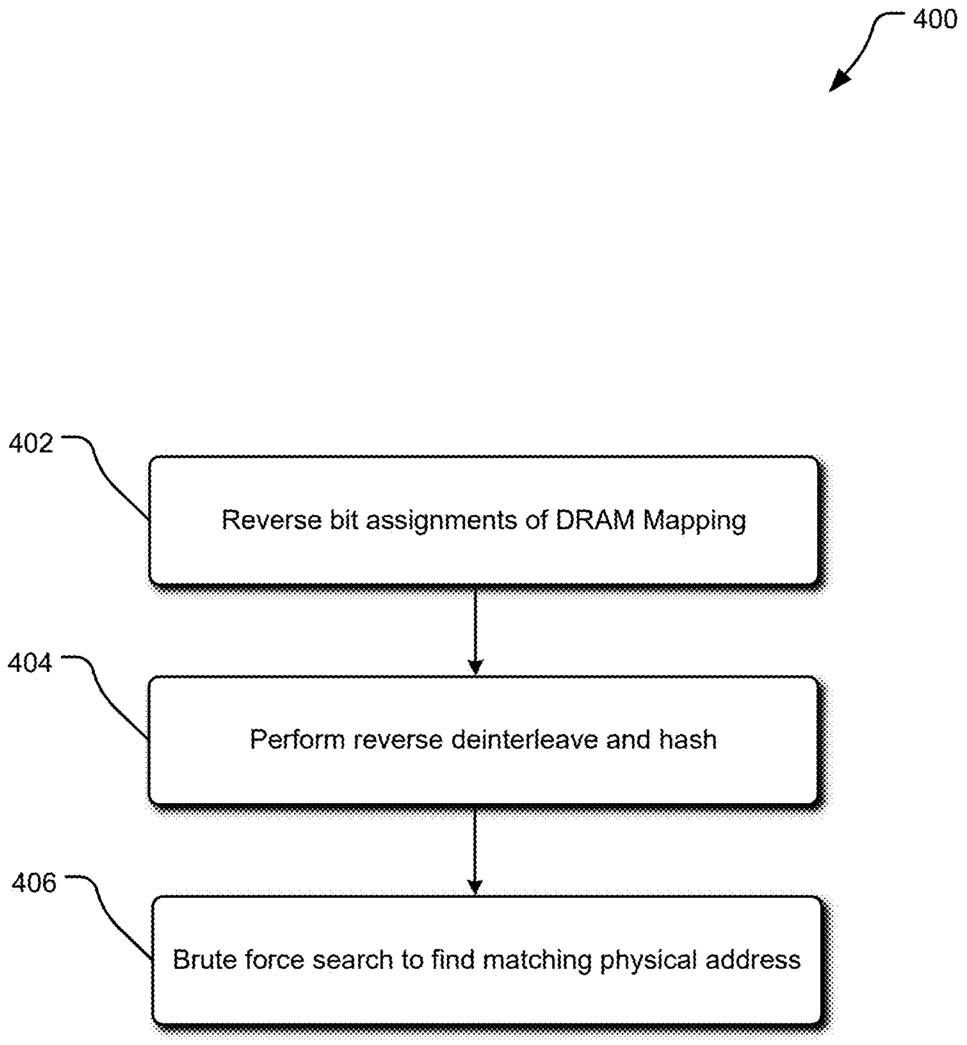
FIG. 4 illustrates an example flowchart of operations for providing reverse mapping between DRAM address and physical address.

FIG. 4 illustrates operations 400 for providing reverse mapping between DRAM address and physical address. At operation 402, the bit assignments of the DRAM address are reverse mapped to generate the deinterleaved physical address. In one implementation, the reverse mapping may be accomplished by a reverse of the table lookup. Subsequently, an operation 404 performs a reverse deinterleave and hash operation by reversing the bank hashing, reversing the low DRAM relocation, and adding back the cache cluster bit removal from the forward stage 4, resulting in a post-processed memory controller physical address. Here the reverse bank hashing may be a reverse of XOR operation. The adding back of the cache cluster bits reverses the dropping of the cache cluster bits.

Subsequently, an operation 406 reverses the hierarchical hashing operations. In one implementation, the reversing the hierarchical hashing may involve brute force searching to find a matching physical address that matches the L3 cache node, the memory controller node, and the cache cluster as determined from the reversing of the deinterleaving and hashing of the DRAM address at operation 308. The brute force search may involve iterating over the bits of the system physical address and running the forward stages 1, 2, and 3, as implemented by operations 302-306 disclosed in FIG. 3, to verify the match. In one implementation, a set number of bits are iterated in a random manner.

Figure 5:
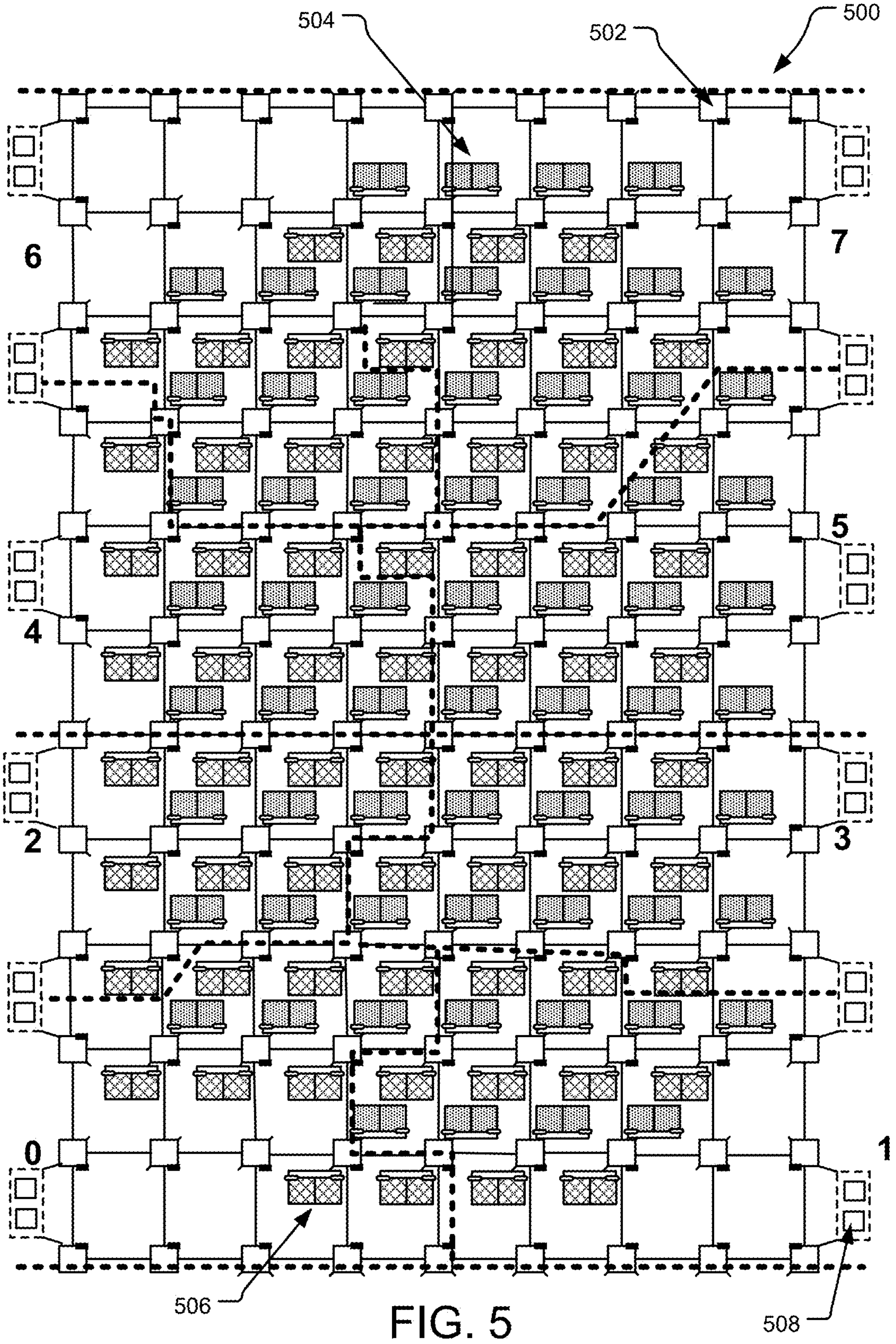
FIG. 5 illustrates an example system on chip (SoC) mesh diagram illustrating cache clusters of L3 cache nodes.

FIG. 5 illustrates a system on chip (SoC) mesh diagram 500 illustrating cache clusters of L3 cache nodes. Specifically, the SoC mesh 500 illustrates the eight cache clusters 0-7. Each of the cache clusters 0-7 may include a number of cross-points 502 where each cross-point 502 serves a routing agent 504 and a component hub module 506. The system for providing forward and reverse mapping between physical address and DRAM address as disclosed herein allows for reverse mapping from the DRAM at memory controller hubs 508 (shown only with respect to a group of cross-points 502 in cluster 1) and a component hub module 506 to the system physical address.

The technical advantage of this system disclosed herein is that it optimizes the decoding of DRAM addresses in a fast, accurate, and comprehensive way. The implementations disclosed are based on a detailed understanding of the hardware design and the address mapping scheme of the system memory map. Specifically, the implementations disclosed herein provide forward translation and reverse translation using software. The implementation disclosed herein provides improvement over other solutions that are implemented using hardware. As a result, the implementation disclosed herein provides new technical functionality, improvement in computational speed, reduction of needed resources, and enhancement in security. Furthermore, the implementations disclosed herein are useful in various applications and scenarios that involve DRAM address decoding, such as debugging, testing, error analysis, performance optimization, and fault tolerance. It can help improve reliability and efficiency.

Typically, a large number of hardware-related server failures in high-performance computing sites are caused by DRAM errors. The disclosed technology, by providing the mapping between system physical address and DRAM using software, allows reducing the hardware-related server failures in high-performance computing sites. Furthermore, by providing the mapping between system physical address and DRAM using software, the disclosed technology provides a significant savings in hardware development, overhead for mitigating issues, and security features with the low-cost flexibility, and modularity.

Other advantages of implementing the mapping between system physical address and DRAM using software include flexibility, cost-effectiveness, scalability, increase in speed of prototyping and development, ease of maintenance and upgrade, and ease of customization.

Figure 6:
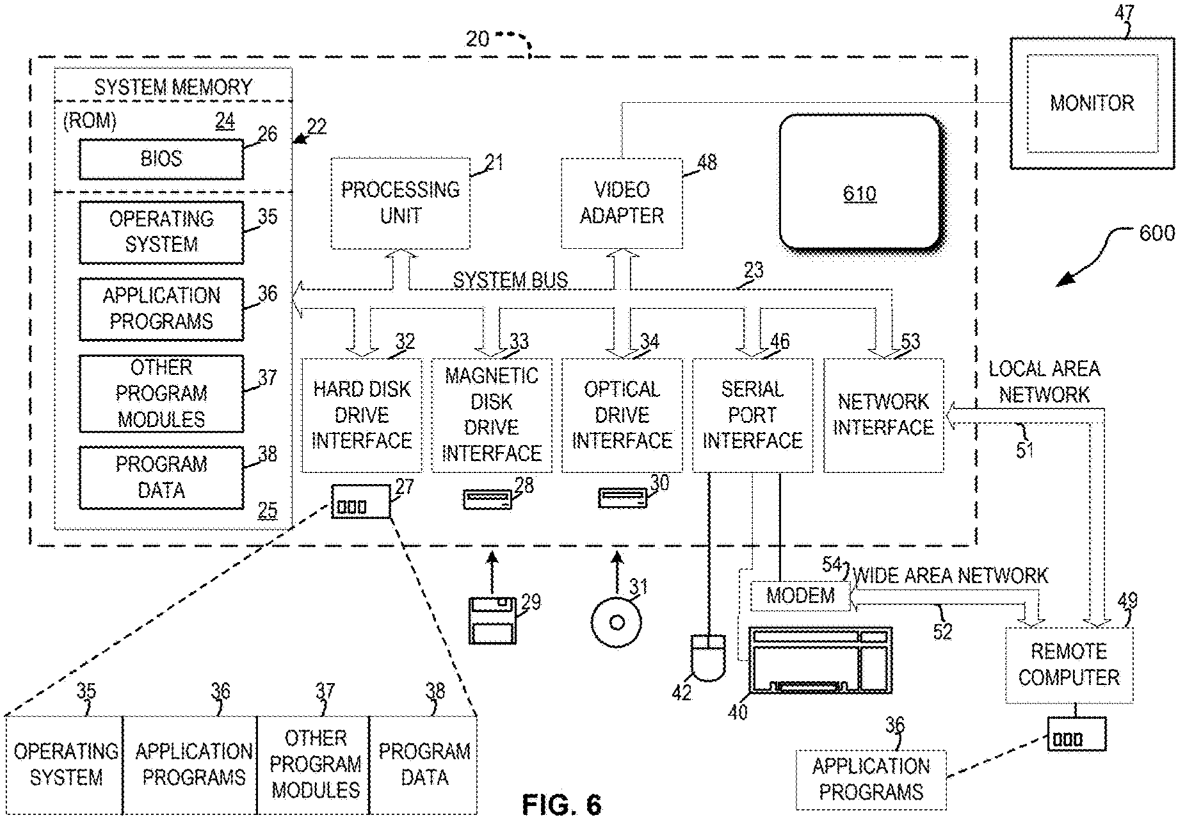
FIG. 6 illustrates an example system that may be useful in implementing the system and method for providing DRAM to physical address conversion.

FIG. 6 illustrates an example system 600 that may be useful in implementing the system for providing forward and reverse mapping between physical address and DRAM address disclosed herein. The example hardware and operating environment of FIG. 6 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 6, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a high latency query optimization system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIG. 6. Similarly, instructions stored on the memory of the computer 20 may also be used to implement one or more operations of FIG. 1. The memory of the computer 20 may also one or more instructions to implement the high latency query optimization system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 7 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the system 610 for providing forward and reverse mapping between physical address and DRAM address may be stored in system memory 22 and processed by the processing unit 21. high latency query optimization system operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of high latency query optimization system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The high latency query optimization system disclosed herein may include a variety of tangible computer-readable storage media and intangible computer-readable communication signals. Tangible computer-readable storage can be embodied by any available media that can be accessed by the high latency query optimization system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the high latency query optimization system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

A method disclosed herein includes determining, based on a system physical address, cluster grouping of L3 cache nodes routed to a set of memory controller nodes, determining, based on the system physical address, an L3 cache node tied to a component hub in a SoC mesh, determining a memory controller node in the SoC mesh that maps to the system physical address, generating a deinterleaved address by relocating low DRAM space of the system physical address and removing the cache cluster bit from the system physical address;, mapping the deinterleaved physical address to a DRAM address by assigning bits to DRAM address components, and storing the bit assignments of the DRAM address components.

An implementation includes one or more physically manufactured computer-readable storage media, encoding computer-executable instructions for executing on a computer system a computer process, the computer process including determining, based on a system physical address, cluster grouping of L3 cache nodes routed to a set of memory controller nodes, determining, based on the system physical address, an L3 cache node tied to a component hub in a SoC mesh, determining a memory controller node in the SoC mesh that maps to the system physical address, generating a deinterleaved address by relocating low DRAM space of the system physical address and removing the cache cluster bit from the system physical address;, mapping the deinterleaved physical address to a DRAM address by assigning bits to DRAM address components, and storing the bit assignments of the DRAM address components.

A system disclosed herein includes a memory, one or more processing units, and a forward and reverse mapping system stored in the memory and executable by the one or more processor units, the cache coherence system encoding computer-executable instructions on the memory for executing on the one or more processor units a computer process, the computer process including determining, based on a system physical address, cluster grouping of L3 cache nodes routed to a set of memory controller nodes, determining, based on the system physical address, an L3 cache node tied to a component hub in a SoC mesh, determining a memory controller node in the SoC mesh that maps to the system physical address, generating a deinterleaved address by relocating low DRAM space of the system physical address and removing the cache cluster bit from the system physical address;, mapping the deinterleaved physical address to a DRAM address by assigning bits to DRAM address components, and storing the bit assignments of the DRAM address components.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:

determining, based on a system physical address, a cluster of Level 3 cache nodes routed to a set of memory controller nodes;

determining, based on the system physical address, a Level 3 cache node tied to a component hub in a system on chip mesh;

determining a memory controller node in the system on chip mesh that maps to the system physical address;

generating a deinterleaved physical address by relocating low DRAM space of the system physical address and removing a cache cluster bit from the system physical address;

mapping the deinterleaved physical address to a DRAM address by assigning bits to DRAM address components; and storing the bit assignments of the DRAM address components.

2. The method of claim 1, wherein determining the cluster of Level 3 cache nodes further comprises determining the cache cluster bit of the system physical address using power of two hashing.

3. The method of claim 1, wherein determining the Level 3 cache node further comprises determining the Level 3 cache node using a non-power of two hashing.

4. The method of claim 1, wherein the DRAM address components include a rank, a bank group, a bank, a row, and a column of the DRAM address.

5. The method of claim 1, wherein generating the deinterleaved physical address further comprises hashing one or more bits of the system physical address.

6. The method of claim 1, further comprising:

reversing the bit assignments of the DRAM address components to regenerate the deinterleaved physical address; and performing reverse deinterleaving on the deinterleaved physical address.

7. The method of claim 6, wherein performing reverse deinterleaving further comprises:

reversing hashing one or more bits of the system physical address;

reversing relocating of the low DRAM space of the system physical address; and adding back the cache cluster bit to the system physical address.

8. The method of claim 6, further comprising matching an output system physical address that maps to the same Level 3 cache node, memory controller node, and cluster of Level 3 cache nodes as the DRAM address.

9. The method of claim 8, wherein matching the output system physical address further comprises iterating over bits of the output system physical address to verify the output system physical address.

10. Tangible computer-readable storage media, encoding computer-executable instructions for executing on a computer system a computer process, the computer process comprising:

receiving a system physical address from a memory management unit (MMU);

determining, based on the system physical address, a cluster of Level 3 cache nodes that are connected to a set of memory controller nodes;

determining, based on the system physical address, an a Level 3 cache node tied to a component hub in a system on chip mesh;

determining a memory controller node in the system on chip mesh that maps to the system physical address;

generating a deinterleaved physical address by relocating low DRAM space of the system physical address and removing a cache cluster bit from the system physical address;

mapping the deinterleaved physical address to a DRAM address by assigning bits to DRAM address components; and storing the bit assignments of the DRAM address components.

11. The tangible computer-readable storage media of claim 10, wherein determining the cluster of Level 3 cache nodes further comprises determining the cache cluster bit using power of two hashing.

12. The tangible computer-readable storage media of claim 10, wherein determining the Level 3 cache node further comprises determining the Level 3 cache node using a non-power of two hashing.

13. The tangible computer-readable storage media of claim 10, wherein the DRAM address components include a rank, a bank group, a bank, a row, and a column of the DRAM address.

14. The one tangible computer-readable storage media of claim 10, wherein generating the deinterleaved physical address further comprises hashing one or more bits of the system physical address.

15. The tangible computer-readable storage media of claim 10, wherein the computer process further comprises:

reversing the bit assignments of the DRAM address components to regenerate the deinterleaved physical address; and performing reverse deinterleaving on the deinterleaved physical address.

16. The tangible computer-readable storage media of claim 15, wherein performing reverse deinterleaving further comprises:

reversing hashing one or more bits of the system physical address;

reversing relocating of the low DRAM space of the system physical address; and adding back the cache cluster bit to the system physical address.

17. A system comprising:

memory;

one or more processing units; and a forward and reverse mapping system stored in the memory and executable by the one or more processing units, the forward and reverse mapping system encoding computer-executable instructions on the memory for executing on the one or more processing units a computer process, the computer process comprising:

determining, based on a system physical address, a cluster of Level 3 cache nodes that map to a set of memory controller nodes;

determining, based on the system physical address, a Level 3 cache node tied to a component hub in system on chip mesh;

determining a memory controller node in the system on chip mesh that maps to the system physical address;

generating a deinterleaved physical address by relocating low DRAM space of the system physical address and removing a cache cluster bit from the system physical address;

mapping the deinterleaved physical address to a DRAM address by assigning bits to DRAM address components; and storing the bit assignments of the DRAM address components.

18. The system of claim 17, wherein the computer process further comprises:

reversing the bit assignments of the DRAM address components to regenerate the deinterleaved physical address; and performing reverse deinterleaving on the deinterleaved physical address.

19. The system of claim 18, wherein performing reverse deinterleaving further comprises:

reversing hashing one or more bits of the system physical address;

reversing relocating of the low DRAM space of the system physical address; and adding back the cache cluster bit to the system physical address.

20. The system of claim 18, wherein the computer process further comprises matching an output system physical address that maps to the same Level 3 cache node, memory controller node, and cluster of Level 3 cache nodes as the DRAM address.

* * * * *